United States Patent [19]

Serturini

[11] Patent Number: 4,763,697
[45] Date of Patent: Aug. 16, 1988

[54] MECHANISM TO CONTROL THE OSCILLATIONS OF THE HEALD FRAME CONNECTING RODS IN A ROTARY DOBBY

[75] Inventor: Giuseppe Serturini, Bergamo, Italy

[73] Assignee: Fimtessile Fabbrica Italiana Macchinario Tessile S.p.A., Ponte Nossa, Italy

[21] Appl. No.: 9,047

[22] Filed: Jan. 29, 1987

[30] Foreign Application Priority Data

Jan. 31, 1986 [IT] Italy ............................ 19248 A/86

[51] Int. Cl.⁴ .............................................. D03C 1/00
[52] U.S. Cl. ................................................... 139/76
[58] Field of Search ................................ 139/66 R, 76

[56] References Cited

U.S. PATENT DOCUMENTS

| 4,362,188 | 12/1982 | Surkamp | 139/76 |
| 4,480,664 | 11/1984 | Hohne et al. | 139/76 |
| 4,497,346 | 2/1985 | Hintsch et al. | 139/76 |
| 4,646,788 | 3/1987 | Brock et al. | 139/76 |

FOREIGN PATENT DOCUMENTS 30930  2/1984  Japan ...................... 139/76

Primary Examiner—Henry S. Jaudon
Attorney, Agent, or Firm—Young & Thompson

[57] ABSTRACT

Mechanism to control the oscillations of connecting rods operating the heald frames in a rotary dobby, of the type wherein, for each frame and connecting rod: the rod is mounted on a drive shaft by way of an eccentric interposed between the shaft and the connecting rod small end; the eccentric can be controlled for rotation, alternatively with the connecting rod or with the shaft, by means of a radial key; mechanism is provided to shift the key to the outer position of engagement of the connecting rod small end; a spring is provided to return the key to the inner position of engagement of the shaft; and an electromagnet is provided to hold, when energized, the key in the outer position of engagement of the connecting rod small end. The electromagnet consists of a pair of magnets, positioned opposite externally to the connecting rod small end and adapted to be alternatively energized, a permanent magnet being associated with one of the magnets, the permanent magnet having a field equal and opposite in sign to that produced by the magnet when it is energized.

11 Claims, 5 Drawing Sheets

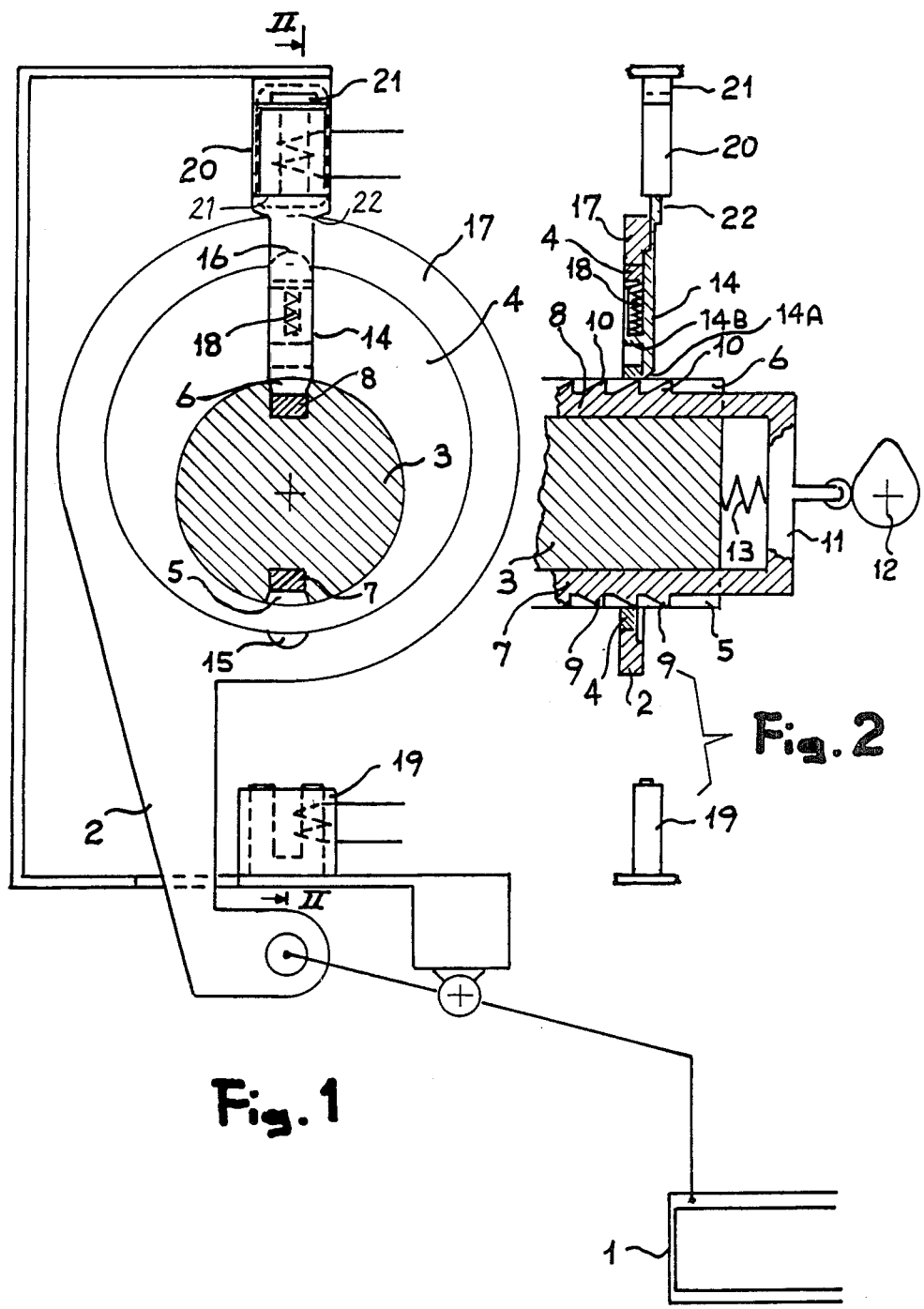

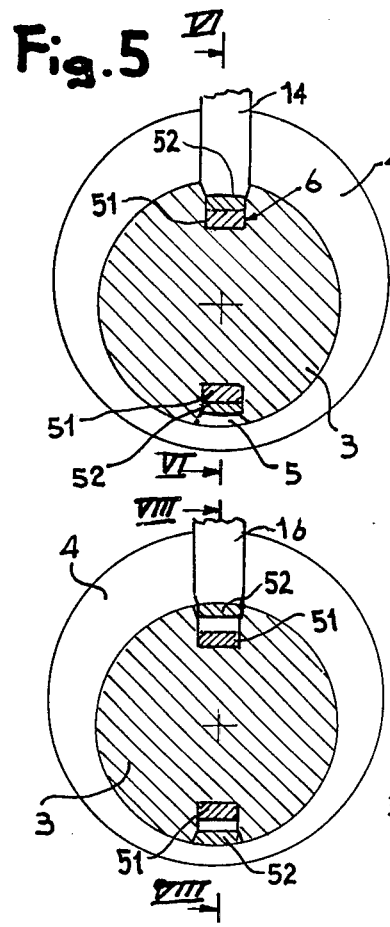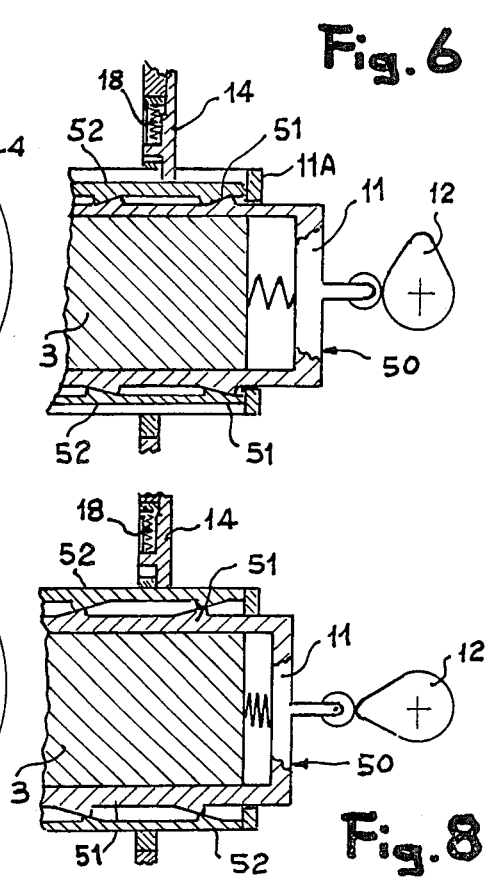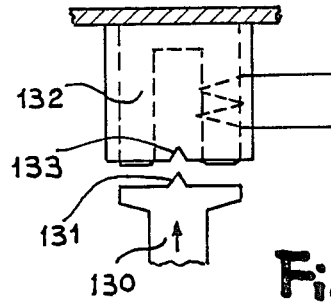

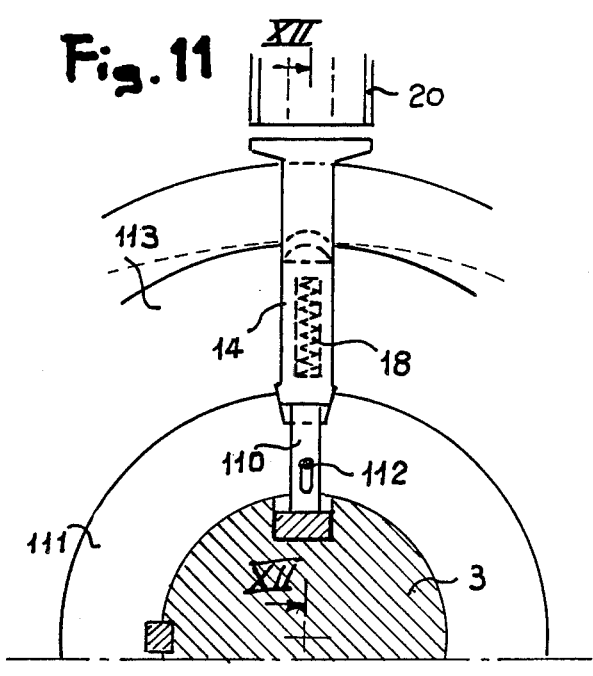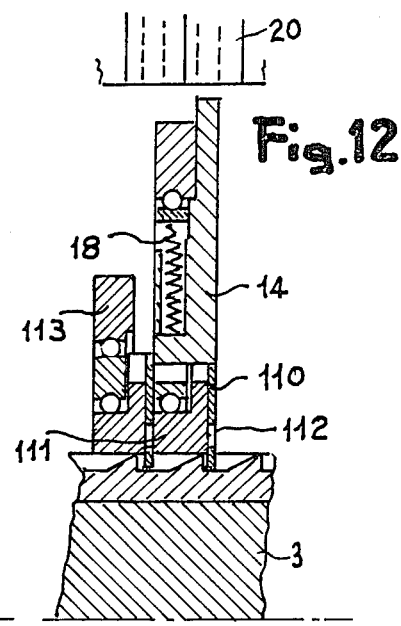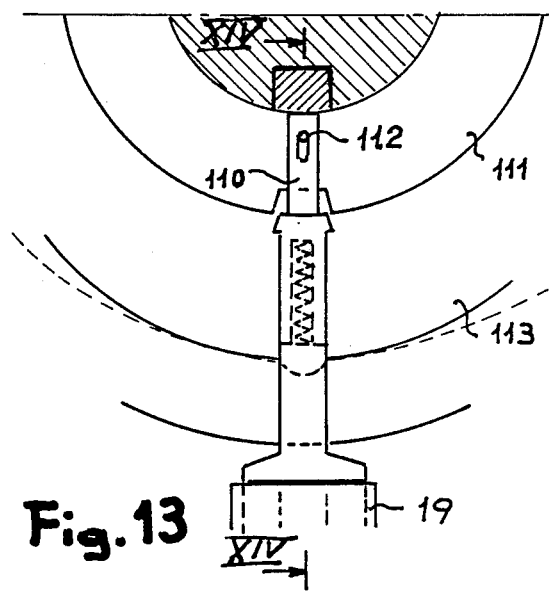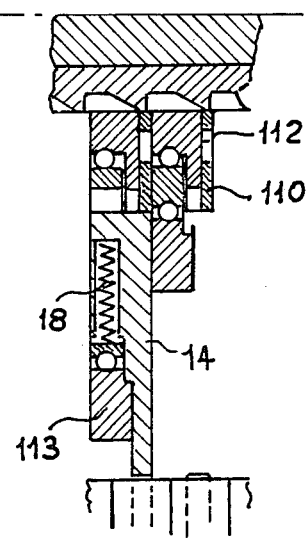

4,763,697

MECHANISM TO CONTROL THE OSCILLATIONS OF THE HEALD FRAME CONNECTING RODS IN A ROTARY DOBBY

BACKGROUND OF THE INVENTION

The present invention concerns rotary dobbies and, more particularly, a mechanism to control the oscillations of the connecting rods operating the heald frames in such dobbies.

There are already known to be mechanisms of this type wherein, for each frame or connecting rod, said rod is mounted on a drive shaft by way of an eccentric interposed between said shaft and the connecting rod small end, and wherein said eccentric can be controlled for rotation, alternatively with the connecting rod or with the shaft, by means of a radial key, thanks to mechanical means adopted to shift said key to the outer position of engagement of the connecting rod small end, and to spring means adapted to return said key to the inner position of engagement of the shaft. There are also known to be mechanisms of the aforementioned type, wherein electromagnetic means are used to hold said key in the outer position of engagement of the connecting rod small end.

Nevertheless, none of these known mechanisms are fully satisfactory—especially at the increasingly higher speeds adopted on modern weaving looms—due to the masses and dimensions (and consequent inertias) of the mechanical elements forming such mechanisms, and to the power consumptions, heating and high noise levels which they involve.

The present invention provides a mechanism to control the oscillations of the connecting rods operating the heald frames in rotary dobbies, which has none of the above drawbacks and which is operates in the most reliable and efficient manner, even at the highest working speeds of the dobby and of the loom equipped therewith, while having at the same time a simple and convenient structure.

SUMMARY OF THE INVENTION

The mechanism according to the invention—of the type wherein, for each frame and connecting rod, said rod is mounted on a drive shaft by way of an eccentric interposed between said shaft and the connecting rod small end, and wherein the eccentric can be controlled for rotation, alternatively with the connecting rod or with the shaft, by means of a radial key, thanks to mechanical means adapted to shift said key to the outer position of engagement of the connecting rod small end, and to spring means adapted to return said key to the inner position of engagement of the shaft, electromagnetic means being provided to hold, when energized, said key in the outer position of engagement of the connecting rod small end—is characterized in that said electromagnetic means consist of a pair of magnets, positioned opposite externally to the connecting rod small end and adapted to be alternatively energized, and in that a permanent magnet is associated with one of said magnets, said permanent magnet having a field equal and opposite in sign to that produced by said magnet when it is energized.

Said electromagnetic means are identical and they act on the key either directly or through appropriate radial thrust elements.

Preferably, the unit comprising said magnet and said permanent magnet associated therewith, is arranged so as to hold the key in the outer position of engagement of the connecting rod small end, when the connecting rod takes up the position in which the heald frames are lowered.

As to the mechanical means for shifting the key to the outer position of engagement of the connecting rod small end, they can be of different types and characteristics. An embodiment of such means, which is very suitable for the purposes of the invention, comprises two racks inserted in two opposite longitudinal seats of the shaft, caused to perform a reciprocating motion synchronized with the shaft movements, the teeth of said racks engaging the end of the key to cause this latter to engage with the connecting rod small end.

BRIEF DESCRIPTION OF THE DRAWINGS

Further characteristics and details of the mechanism according to the invention will appear from the following description of some embodiments thereof, given by mere way of example with reference to the accompanying drawings, which all represent the single drive shaft of the mechanism and only one of the many side-by-side assemblies—comprising the heald frame, the levers, the connecting rod, the eccentric and the electromagnetic means—forming said mechanism, which also provides for a single common mechanical member to shift each of the keys for said assemblies. In the drawings:

FIG. 1 is a section view through the axis of the drive shaft, of a first embodiment of the mechanism according to the invention;

FIG. 2 is a section view, perpendicular to that of FIG. 1, of the same mechanism;

FIGS. 5 to 8 illustrate a variant of the embodiment of the mechanism shown in FIGS. 1 and 2, in two different working steps, each represented by two section views at 90° to each other;

FIGS. 11 to 14 illustrate a fourth embodiment of the mechanism according to the invention, in two different working steps, each represented by two section views at 90° to each other, one step being shown in FIGS. 11 and 12 and the other step in FIGS. 13 and 14;

FIG. 15 is a detail illustrating a preferred embodiment of the keeper and armature for the magnets used in the mechanism according to the invention.

DESCRIPTION OF THE PREFERRED EMBODIMENTS

Figures 3, 4:
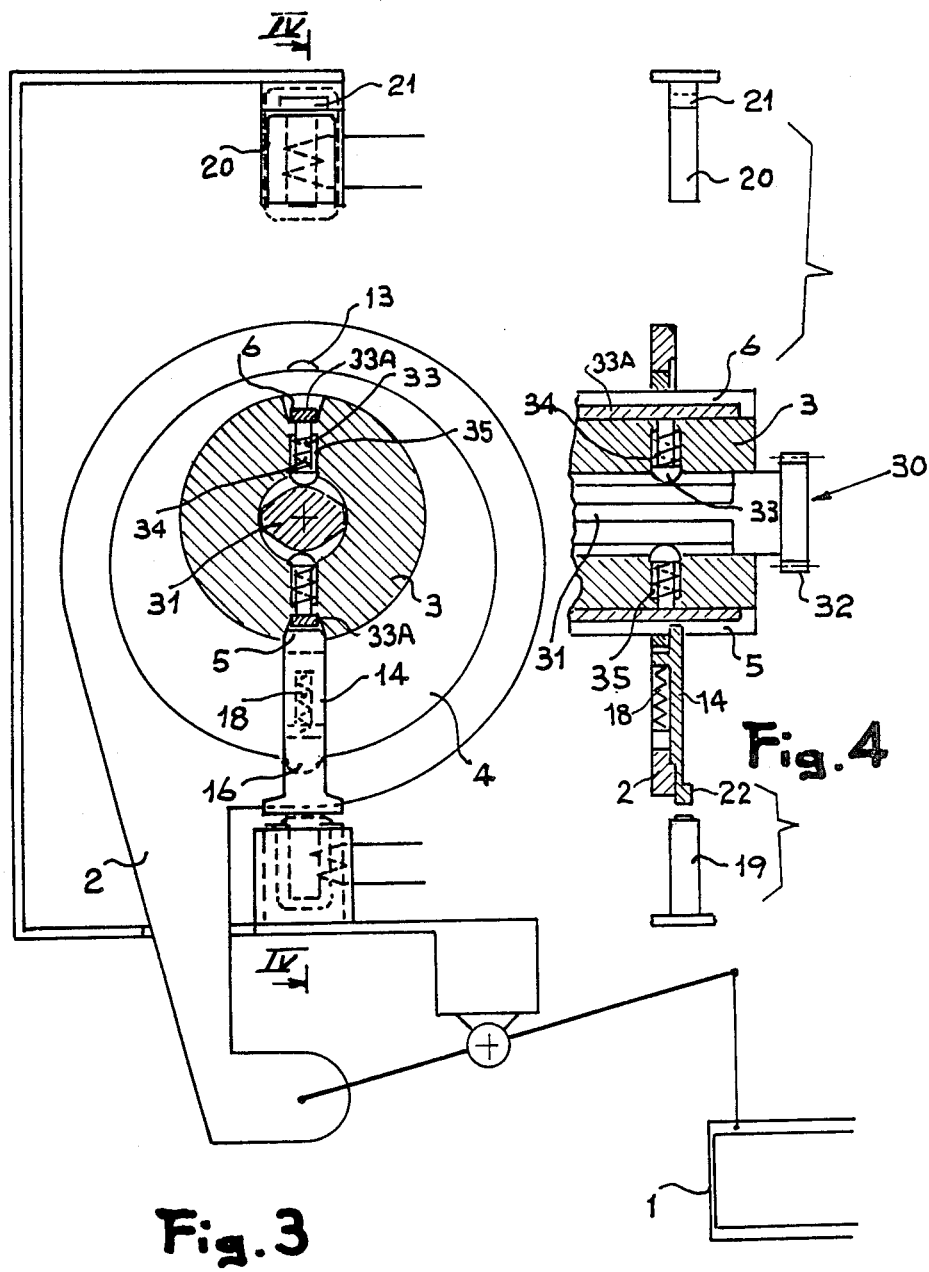
FIGS. 3 and 4 are section views, similar to those of FIGS. 1 and 2, showing a second embodiment of the mechanism according to the invention, in a different working step.

Referring first of all to FIGS. 1 and 2 of the drawings, a heald frame 1 is controlled—through a lever system—by a connecting rod 2 mounted on a drive shaft 3 by way of an interposed eccentric disc 4.

The shaft 3—having, in known manner, an intermittent motion allowing it to perform a 180° rotation each time—is provided with two opposed external longitudinal seats 5 and 6, in which are housed the two arms 7 and 8, outwardly formed with saw-teeth 9 and 10, of a shifting member 11 controlled by an eccentric 12 against the action of a return spring 13.

In a suitable seat in the disc 4 there is radially housed a key 14 adapted to engage with its ends, according to its position, one of the seats 5 and 6 of the shaft 3 or, alternatively, one of two opposite grooves 15 and 16 formed in the small end 17 of the connecting rod 2. A return spring 18 normally presses the key 14 towards the shaft 3, with its inner end against the shifting member 11 or in one of the seats 5 and 6 of the shaft 3. It should be noted that, for a proper engagement with the saw-teeth 9 or 10 of the arms 7 and 8 of the shifting member 11, the key 14 has its inner end suitably beveled at 14A. Spring 18 acts against a projection 14B on key 14.

Two magnets 19 and 20—which can be suitably energized under control—are mounted, one opposite to the other, externally to the connecting rod small end 17 and aligned on the diameter along which the seats 5 and 6 take up a position when the shaft 3 stops in its intermittent motion. According to the invention, a permanent magnet 21 is associated with the magnet 20, said permanent magnet having a field equal and opposite in sign to that produced by the magnet 20 when it is energized.

FIGS. 1 and 2 show the mechanism as it is arranged when the heald frame is in a lowered position. In this arrangement, the shifting member 11 has caused, with its arm 8, the key 14 to engage with its outer end the groove 16 of the small end 17 of the connecting rod 2, and to simultaneously contact, with an extension 22 thereof (FIG. 2)—having its end formed like a magnet keeper—the armature of the magnet 20. To this end, tooth 10 lifts key 14 against the action of spring 18 by pressing against beveled end 14A. Since on said armature there acts the field of the permanent magnet 21, but not that of the magnet 20 which is de-energized, the key 14 is maintained in this position (into which it has been moved by the shifting member 11) and it does not engage with its inner end the seat 6 of the drive shaft 3, which can therefore rotate without the mechanism transmitting any motion to the heald frame 1. Member 11 then resumes its original position, thanks to spring 13.

If, at this stage, the magnet 20 is energized, the field of the permanent magnet 21 becomes totally balanced and the key 14, no longer held in the previous position, is shifted towards the shaft 3 by the return spring 18 and engages with its inner end the seat 6 of said shaft, while its outer end leaves the groove 16 of the small end 17 of the connecting rod 2, after the shifting member 11 has returned to its starting position.

During the successive step, the drive shaft 3 rotates by 180° and with it rotate the eccentric disc 5 with the key 14, thereby causing the oscillation of the connecting rod 2 and the motion of the heald frame 1.

After the shaft 3 has completed its 180° rotation, the key 14 finds itself aligned with the axis of the magnet 19, while the connecting rod 2 has moved to the position in which the heald frame 1 is totally lifted. The shifting member 11 acts once more and the key 14 is shifted outwardly, against the action of the spring 18. In this situation, the magnet 19 can be alternatively de-energized or energized: in the first case the key 14, thanks to the action of the spring 18, promptly engages again in the seat 6 of the shaft 3 so that, through the successive rotation of said shaft, the connecting rod 2 continues to rotate until it takes up again the starting position; in the second case, the key 14 is held in its outer position and the engagement between the shaft 3 and the eccentric disc 5 is removed, so that the successive motion of the shaft 3 is not transmitted to the connecting rod 2 and the heald frame 1 remains motionless in its lifted position.

FIGS. 3 to 14 show other possible embodiments of the mechanism according to the invention, or modifications of the one already described.

Thus, FIGS. 3 and 4 illustrate a second embodiment of the mechanism, adopting a key shifting member of different type from that used in the embodiment of FIGS. 1 and 2. This shifting member 30 is axially housed in the shaft 3, instead of being external thereto, and it consists of a shaped bar 31, caused to rotate by an end gearwheel 32, external to the shaft 3. The bar 31 acts like a cam on the key 14, through thrust pins 33—opposed by springs 34—which are housed in opposed radial holes 35 of the shaft 3, said holes opening into the seats 5 and 6 in which engages the key 14. A bar 33A interconnects a plurality of pins 33 spaced apart lengthwise of shaft 3.

The working of this mechanism does not differ from that of the mechanism of FIGS. 1 and 2, save for the different motion of the shifting member 30, which is rotary motion instead of a rectilinear reciprocating motion.

FIGS. 5 to 8 illustrate, in turn, two different working steps of an embodiment of the mechanism according to the invention, which has been slightly modified in respect of that shown in FIGS. 1 and 2, so as to prevent sliding and transverse stresses in correspondance of the key, when this latter is operated by the shifting member. For this purpose, the shifting member 50 of this modified embodiment of the mechanism according to the invention comprises, in association with its two saw-toothed arms 51, housed and axially sliding in the seats 5 and 6 of the shaft 3, a pair of guides 52 which are also housed in the seats 5 and 6—made suitably deeper for the purpose and closed at their ends by discs 11A—and which are provided with saw-teeth similar and opposite to those of the arms 51, with which they engage. The axial movements of the member 50 are thus converted into radial movements of the guides 52, which press on the key 14 to in turn shift it radially. For the rest, the working of this mechanism does not differ from that of the previous embodiments.

Figure 9:
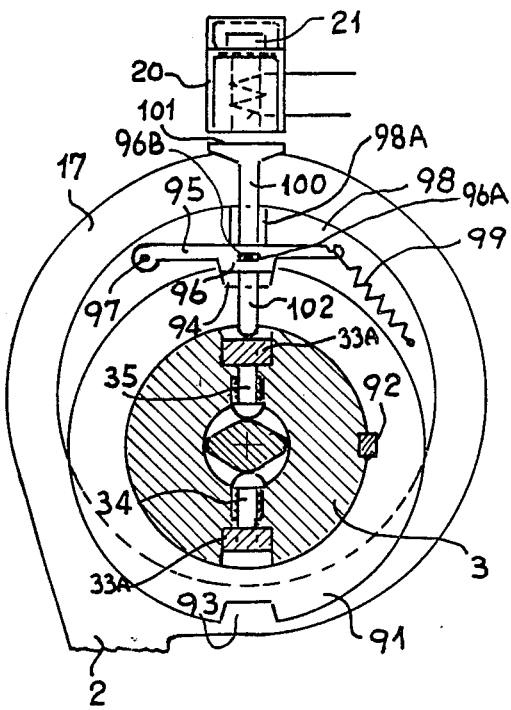
FIGS. 9 and 10 are section views of a third embodiment of the mechanism according to the invention, in two different working steps.
Figure 10:
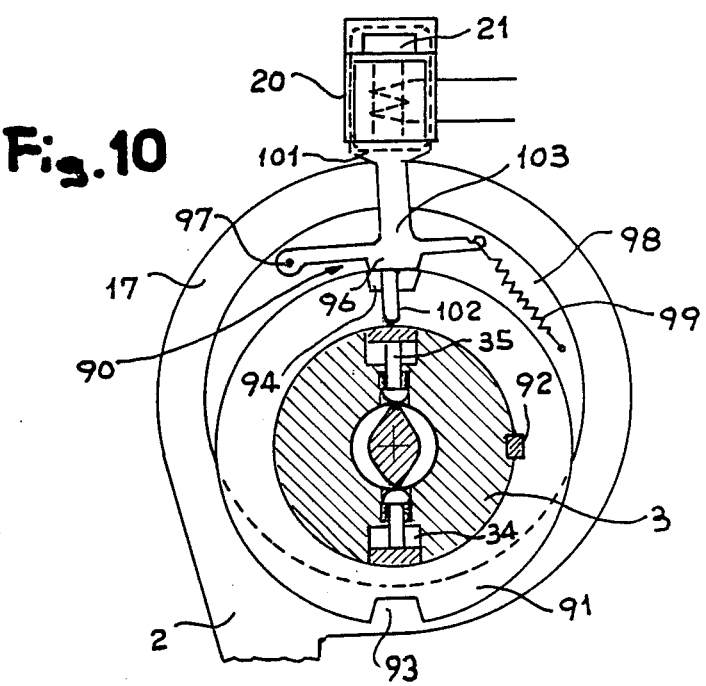

FIGS. 9 and 10 illustrate two modifications of a different, third embodiment of the mechanism according to the invention, which uses a shifting member of the type of that adopted in the mechanism of FIGS. 3 and 4, but providing for a different type of engagement 90 between the drive shaft 3 and the eccentric disc.

According to the arrangement of FIG. 9, the shaft 3 is surrounded by a circular connection ring 91, keyed to said shaft in 92 and comprising two diametrally opposite grooves 93 and 94, into which is adapted to engage, in the manner of a key, the protuberance 96 of a handle 95 pivoted at one end—at 97—to an eccentric disc 98, interposed between the drive shaft 3 and the small end 17 of the connecting rod 2. The handle 95 is subjected, at its other end, to the return action of a spring 99, which tends to drive the proturberance 96 into the grooves 93 and 94. A distinct radial thrust element 100 carried by a guideway 98A of disc 98 is articulated at the centre of the handle 95 by a pin 96B in a slot 96A and cooperates therewith, the outer end of said element being in the form of a keeper 101 for the magnets 19 or 20, while its inner end has an extension 102 adapted to bear against the surface of the shaft 3, or against the thrust pins 34 or 35, of each of which a plurality is interconnected by a bar 33A.

The arrangement of FIG. 10 differs from that of FIG. 9 merely for the fact that the handle and the thrust element from a single solid cross member 103.

Both these embodiments of the device work similarly to that of FIGS. 3 and 4, with the difference—in some cases advantageous—that, in these embodiments, the engagement between the eccentric disc and the drive shaft is obtained by way of a lever arm.

FIGS. 11 to 14 illustrate a further embodiment of the mechanism shown in FIGS. 1 and 2; in this embodiment, a shifting member 11—of the type already described with reference to FIGS. 1 and 2—controls the movements of the key 14 by way of thrust plates 110, moving radially inside a union ring 111 and guided therein by pins 112. In these figures, illustrating two opposed working steps of the mechanisms, reference 113 indicates the eccentric disc, whose eccentricity is demonstrated by an arcuate centric dashed line in FIGS. 11 and 13, while the other elements, which do not differ from those of the mechanism shown in FIGS. 1 and 2, are indicated with the same references as in these figures.

FIG. 15 finally illustrates a form of construction—deemed particularly advantageous for the mechanism according to the invention—of the keeper and armature for the magnets in said mechanism. As shown, a protuberance 131 of the keeper 130 finds a corresponding seat or cavity 133 in the armature 132, so as to make it easier for said keeper—and the key 14 connected thereto—to hold a correct position while the mechanism according to the invention is working.

It is to be understood that there may be other embodiments of the invention, differing from those heretofore described and illustrated, the essential advantage of the mechanism according to the invention—in respect of the known mechanisms having the same object—lying in the possibility of a simple structure and an efficient working, which are guaranteed by the basic system—namely, a pair of magnets, with one of which there is associated a permanent magnet—in operating the engagement and disengagement between the drive shaft and the connecting rods for the heald frames, in order to control the lifting and lowering of such frames.

I claim:

1. Mechanism to control the oscillations of connecting rods operating the heald frames in a rotary dobby—of the type wherein, for each frame and connecting rod, said rod is mounted on a drive shaft by way of an eccentric interposed between said shaft and a small end of the connecting rod, and wherein said eccentric can be controlled for rotation, alternatively with the connecting rod or with the shaft, by means of a radial key, mechanical means adapted to shift said key to an outer position of engagement with the connecting rod small end, spring means adapted to return said key to an inner position of engagement with the shaft, electromagnetic means to hold, when energized, said key in said outer position of engagement with the connecting rod small end, said electromagnetic means comprising a pair of magnets, positioned oppositely externally to the connecting rod small end and adapted to be alternatively energized, and a permanent magnet associated with one of said magnets, said permanent magnet having a field equal and opposite in sign to that produced by said one magnet when said one magnet is energized.

2. Mechanism as in claim 1, wherein said magnets are alike and they act directly on the key as on a magnet keeper.

3. Mechanism as in claim 1, wherein said magnets are alike and they act on the key by way of radial thrust elements, the outer end of which is formed as a magnet keeper.

4. Mechanism as in claim 1, wherein the unit comprising said one magnet and said permanent magnet associated therewith, is arranged so as to hold the key in the outer position of engagement of the connecting rod small end, when the connecting rod takes up the position in which the heald frames are lowered.

5. Mechanism as in claim 1, wherein the mechanical means for shifting the key comprise two toothed racks inserted in two opposite longitudinal seats of the shaft, said racks being adapted to perform a reciprocating motion synchronized with the shaft movements, the teeth of said racks engaging the end of the key to cause this latter to engage with the connecting rod small end.

6. Mechanism as in claim 5, wherein the teeth of said racks engage with similar and opposite teeth of guides interposed between said racks and the key.

7. Mechanism as in claim 5, wherein the teeth of said racks axially engage with thrust plates moving radially inside a union ring surrounding the drive shaft, said plates in turn axially engaging with the key.

8. Mechanism as in claim 1, wherein the mechanical means for shifting the key comprise a shaped rotating bar, axially positioned inside the drive shaft and acting on radial thrust pins housed in said shaft and pressing on the inner end of the key.

9. Mechanism as in claim 1, wherein the mechanical means for shifting the key comprise a handle pivoted at one end to the eccentric and stressed at the opposite end by a spring, said handle having a protuberance acting as a key adapted to engage in opposed grooves of a connection ring keyed to the drive shaft, and a radial thrust element cooperating with said handle and being subjected to the action of the key shifting member.

10. Mechanism as in claim 9, wherein said radial thrust element is separate from the handle.

11. Mechanism as in claim 9, wherein said radial thrust element is in one piece with the handle.

* * * * *